(12) United States Patent
Kim et al.

(10) Patent No.: US 8,498,662 B2
(45) Date of Patent: Jul. 30, 2013

(54) METHOD TO GENERATE POWER CONTROL INFORMATION AND METHOD OF POWER CONTROL FOR UPLINK

(75) Inventors: Ji Hyung Kim, Daejeon (KR); Dong Seung Kwon, Daejeon (KR); Ju-Hyup Kim, Suwon-si (KR); Een-Kee Hong, Songnam-si (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 188 days.

(21) Appl. No.: 12/989,034

(22) PCT Filed: Apr. 21, 2009

(86) PCT No.: PCT/KR2009/002066
§ 371 (c)(1),
(2), (4) Date: Oct. 21, 2010

(87) PCT Pub. No.: WO2009/131352
PCT Pub. Date: Oct. 29, 2009

(65) Prior Publication Data
US 2011/0039597 A1    Feb. 17, 2011

(30) Foreign Application Priority Data

Apr. 24, 2008 (KR) .................. 10-2008-0038095
Mar. 30, 2009 (KR) .................. 10-2009-0026824

(51) Int. Cl.
*H04Q 7/20* (2006.01)
(52) U.S. Cl.
USPC ............. 455/522; 455/69; 455/500; 455/517; 455/509; 455/67.11; 370/310; 370/328; 370/350; 370/329; 370/338
(58) Field of Classification Search
USPC .................. 455/522, 68, 69, 127.1, 500, 517, 455/509, 515, 67.11, 426.1, 426.2, 445, 412.1, 455/412.2, 450; 370/310, 350, 328, 329, 370/338
See application file for complete search history.

(56) References Cited

U.S. PATENT DOCUMENTS

2005/0105589 A1    5/2005   Sung et al.
2008/0032731 A1*   2/2008   Shen et al. .................... 455/522
(Continued)

FOREIGN PATENT DOCUMENTS

EP           1 855 502 A1     11/2007
KR     10-2005-0048357         5/2005
(Continued)

OTHER PUBLICATIONS

Notification of Transmittal of the International Search Report and Written Opinion of the International Searching Authority, or the Declaration dated Sep. 30, 2010 in connection with PCT Patent Application No. PCT/KR2009/002066.
(Continued)

*Primary Examiner* — Keith Ferguson

(57) ABSTRACT

In a communication system including a plurality of base stations and a plurality of terminals belonging to each of the base stations, the base station receives information on subcarriers allocated to a terminal that belongs to an adjacent base station from the adjacent base station. Thereafter, the base station generates power control information on the basis of the subcarrier information and transmits the power control information to the terminal, and the terminal controls uplink power on the basis of the received power control information. At this time, the power control information, as information based on estimating hitting between subcarriers used by the terminal that belongs to the base station and subcarriers used by the adjacent base station, may be a ratio found by dividing the total number of subcarriers used by each terminal that belongs to the adjacent base station by the entire number of subcarriers that can be used by the base station.

19 Claims, 3 Drawing Sheets

U.S. PATENT DOCUMENTS

| | | |
|---|---|---|
| 2008/0037413 A1 | 2/2008 | Gu et al. |
| 2008/0081564 A1 | 4/2008 | Rao |
| 2008/0102822 A1* | 5/2008 | Feng et al. ............... 455/425 |
| 2011/0312367 A1* | 12/2011 | Meiyappan ............... 455/522 |

FOREIGN PATENT DOCUMENTS

| | | |
|---|---|---|
| KR | 10-2007-0118529 | 12/2007 |
| KR | 10-2008-0014421 | 2/2008 |
| WO | WO 2005/046274 A1 | 5/2005 |
| WO | WO 2007/145461 A2 | 12/2007 |
| WO | WO 2008/011318 A2 | 1/2008 |

OTHER PUBLICATIONS

Jim Tomcik, et al., "MBFDD and MBTDD: Proposed Draft Air Interface Specification", IEEE 802.20 Working Group on Mobile Broadband Wireless Access, Jan. 6, 2006, 772 pages.

Korean Notice of Allowance dated Jan. 28, 2013 in connection with Korean Patent Appl. No. 10-2009-0026824, 6 pages.

* cited by examiner

METHOD TO GENERATE POWER CONTROL INFORMATION AND METHOD OF POWER CONTROL FOR UPLINK

CROSS-REFERENCE TO RELATED APPLICATION(S)

The present application claims priority under 35 U.S.C. §365 to International Patent Application No. PCT/KR2009/002066 filed Apr. 21, 2009, entitled "METHOD TO GENERATE POWER CONTROL INFORMATION AND METHOD OF POWER CONTROL FOR UPLINK". International Patent Application No. PCT/KR2009/002066 claims priority under 35 U.S.C. §365 and/or 35 U.S.C. §119(a) to Korean Patent Application No. 10-2008-0038095 filed Apr. 24, 2008 and Korean Patent Application No. 10-2009-0026824 filed Mar. 30, 2009 which are incorporated herein by reference into the present disclosure as if fully set forth herein.

TECHNICAL FIELD

The present invention relates to a method of power control for uplink considering adjacent cells.

BACKGROUND ART

In a communication system, a plurality of base stations use a plurality of subcarriers having the same index, and each base station allocates different subcarriers to a plurality of terminals that belong to each cell. Therefore, while cell-in interference can be minimized, other cell interference (OCI) is generated due to communication power of the terminals that belong to the cell.

In particular, when a terminal positioned at a cell boundary area transmits a high-power signal to the base station, cells adjacent to the cell including the terminal are influenced by fatal interference. Accordingly, power control is required depending on interference states of the adjacent cells.

For this, the terminal controls power depending on whether or not an average interference value of the adjacent cells exceeds a predetermined reference. However, in the communication system, it is a key point how frequent the subcarriers actually hit each other in comparison with the average interference value.

For example, when a small number of subcarriers are subjected to very large interference, the average interference value of the corresponding cell is large while the number of subcarriers that actually hit each other is small, such that it is not necessary to lower power. That is, the power control based on the average interference value cannot specifically reflect whether or not the used subcarriers hit each other on the power control.

The above information disclosed in this Background section is only for enhancement of understanding of the background of the invention and therefore it may contain information that does not form the prior art that is already known in this country to a person of ordinary skill in the art.

SUMMARY

The present invention provides a method of power control for uplink having advantages of controlling transmission power of a terminal on the basis of information on subcarriers used in adjacent cells.

An exemplary embodiment of the present invention provides a method to generate power control information.

The method to generate power control information in a base station includes: receiving subcarrier information on subcarriers allocated to a plurality of first terminals that belong to at least one adjacent base station from the adjacent base station, generating power control information on the basis of the subcarrier information, and transmitting the power control information to a second terminal that belongs to the base station.

The power control information may represent a relationship between subcarriers allocated to the second terminal and subcarriers allocated to the plurality of first terminals.

Another embodiment of the present invention provides a method of power control for uplink. The method of power control for uplink in a terminal includes receiving power control information that represents a relationship between subcarriers used by the terminal and subcarriers used by at least one adjacent base station from a base station, and controlling uplink power on the basis of the power control information.

ADVANTAGEOUS EFFECTS

According to the present invention, there can be provided a method of power control for uplink that controls transmission power of a terminal on the basis of information on subcarriers used in an adjacent cell.

DETAILED DESCRIPTION

Figure 1:
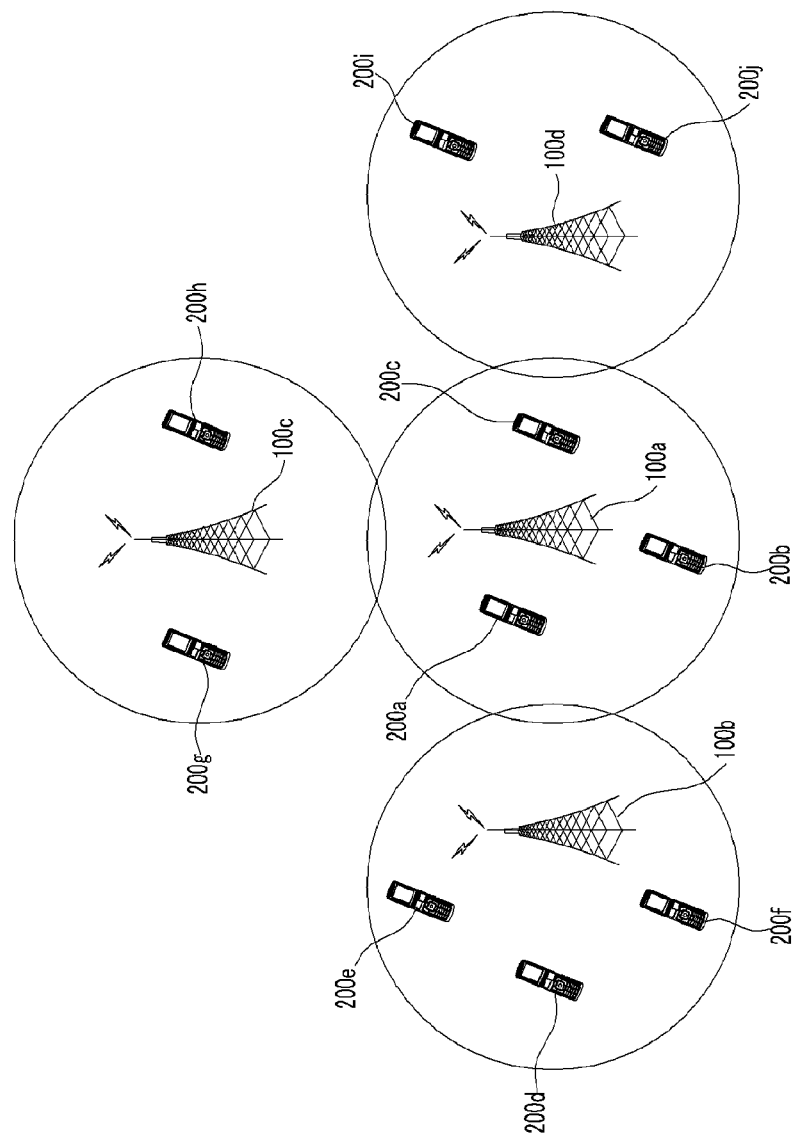
FIG. 1 is a diagram illustrating a communication system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, in addition, unless explicitly described to the contrary, the word "comprise" and variations such as "comprises" or "comprising" will be understood to imply the inclusion of stated elements but not the exclusion of any other elements. In addition, the terms "-er", "-or", and "module" described in the specification mean units for processing at least one function and operation, and can be implemented by hardware components or software components and combinations thereof.

In the specification, a terminal may designate a mobile station (MS), a mobile terminal (MT), a subscriber station (SS), a portable subscriber station (PSS), user equipment (UE), an access terminal (AT), etc., and may include the entire or partial functions of the terminal, the mobile terminal, the subscriber station, the portable subscriber station, the user equipment, the access terminal, etc.

In the specification, a base station (BS) may designate an access point (AP), a radio access station (RAS), a node B, a base transceiver station (BTS), a mobile multihop relay (MMR)-BS, etc., and may include the entire or partial functions of the access point, the radio access station, the node B, the base transceiver station, the MMR-BS, etc.

In the specification, it is assumed that "hitting between subcarriers" is generated between terminals that belong to different cells and use the same subcarrier, and is not generated between terminals that belong to the same cell.

In the specification, the term "monitoring cells" represents adjacent cells that are largely influenced by a terminal positioned at a boundary area of the cells.

Hereinafter, a method to generate power control information and a method of power control for uplink according to an exemplary embodiment of the present invention will be described in detail with reference to the accompanying drawings.

FIG. 1 is a diagram illustrating a communication system according to an exemplary embodiment of the present invention.

Referring to FIG. 1, the communication system according to an exemplary embodiment of the present invention includes a plurality of base stations 100a to 100d and a plurality of terminals 200a to 200j. The base stations 100a to 100d and the terminals 200a to 200j operate in the same manner, such that one base station 100a and one terminal 200a will be described.

The base station 100a transmits information (hereinafter, "information on subcarriers allocated to a terminal that belongs to the base station") on subcarriers allocated to the terminals 200a to 200c that belong to the base station 100a to the adjacent base stations 100b to 100d, and receives information on the subcarriers of the base stations 100b to 100d from the adjacent base stations 100b to 100d.

Thereafter, the base station 100a generates power control information for the terminals 200a to 200c that belong to the base station 100a on the basis of the received subcarrier information, and transmits the generated power control information to the terminals 200a to 200c.

The terminal 200a determines uplink transmission power on the basis of the power control information received from the base station 100a.

Figure 2:
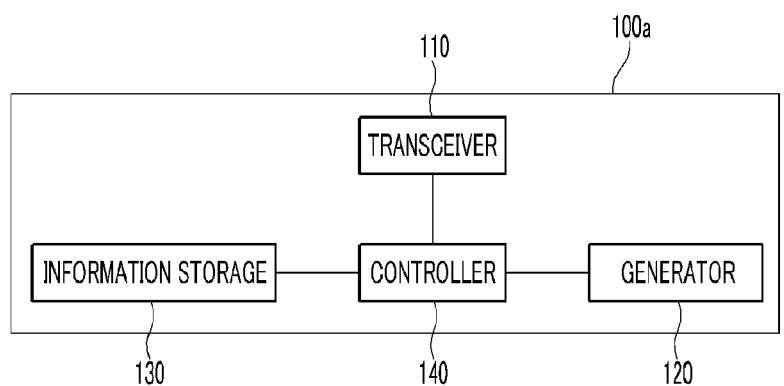
FIG. 2 is a schematic block diagram of a base station 100a according to an exemplary embodiment of the present invention.

FIG. 2 is a schematic block diagram of a base station 100a according to an exemplary embodiment of the present invention.

Referring to FIG. 2, the base station 100a according to an exemplary embodiment of the present invention includes a transceiver 110, a generator 120, an information storage 130, and a controller 140.

The transceiver 110 receives the subcarrier information of the base stations 100b to 100d from the adjacent base stations 100b to 100d and transmits the power control information of each terminal to the terminals 200a to 200c that belong to the base station 100a.

At this time, the subcarrier information received from the adjacent base stations 100b to 100d is information on subcarriers allocated to each terminal at a frame after a predetermined point from a current frame. Further, the power control information transmitted to the terminals 200a to 200c is information for determining the uplink transmission power of the frame after a predetermined point from the current frame.

The generator 120 generates the power control information on the terminals 200a to 200c for each frame on the basis of information on monitoring cells of the terminals 200a to 200c, which is stored in the information storage 130.

The power control information, as information for estimating whether or not the subcarriers used in the terminal and the subcarrier used in the monitoring cell hit each other, may be variously implemented and will be described below in detail.

Embodiment 1

Embodiment 1 uses a loading factor of a subcarrier as power control information.

The "loading factor (LF)" is a factor found by dividing the total number of subcarriers used by each terminal that belongs to the monitoring cell by the entire number of subcarriers that can be used by a base station 110a, and is defined as shown in Equation 1.

LF=Total number of subcarriers used by all terminals/total number of subcarriers [Equation 1]

The loading factor has a value in the range of 0 to 1. A loading factor that is close to 1 means that many subcarriers are allocated and used in the monitoring cell, and that a possibility that the terminal of the base station 100a will use the same subcarrier as the terminal of the monitoring cell is high. Further, in the case of using the same subcarrier, hitting occurs to act as interference while transmitting data.

Embodiment 2

Embodiment 2 uses a terminal hitting probability as the power control information.

The "terminal hitting probability" is a probability of using the same subcarrier as the monitoring cell among subcarriers allocated to the terminal and is defined as shown in Equation 2.

Terminal hitting probability=Number of the same subcarriers as monitoring cell/number of subcarriers allocated to terminal [Equation 2]

The terminal hitting probability also has a value in the range of 0 to 1. As the terminal hitting probability is close to 1, a possibility that the subcarriers used by the terminal and the subcarriers used by the terminal of the monitoring cell will hit each other, that is, interference, increases.

Embodiment 3

Embodiment 3 uses a monitoring cell hitting probability as the power control information.

The "monitoring cell hitting probability" is a probability of using the same subcarrier as the subcarrier used in the cell including the terminal among the entire subcarriers used by the monitoring cell, and is defined as shown in Equation 3.

Monitoring cell hitting probability=Number of the same subcarriers/number of subcarriers allocated to monitoring cell [Equation 3]

The monitoring cell hitting probability also has a value in the range of 0 to 1. As the monitoring cell hitting probability is close to 1, a possibility that the subcarriers used by the terminal and the subcarriers used by the terminal of the monitoring cell will hit each other, that is, interference, increases.

The power control information generated as described in the above-mentioned embodiments is classified into a large-interference state, a normal interference state, and a small interference state in accordance with the values and the terminal controls communication power depending on the interference state.

Embodiment 1 will be described as an example. When the loading factor has a smaller value than a minimum reference, the terminal increases the communication power by determining that the interference is small. Further, when the loading factor is equal to or larger than the minimum reference and is smaller than a maximum reference, the terminal maintains previous power by determining that the interference is normal, and when the loading factor is equal to or larger than the maximum reference, the terminal decreases the communication power by determining that the interference is large.

At this time, the maximum reference and the minimum reference which become references for power control may be previously set by a test.

The information storage 130 stores the subcarrier information of each cell received from the adjacent base stations 100b to 100d, the information on the subcarriers allocated to each of the terminals 200a to 200c that belong to the base station 100a, the monitoring cell information of each of the terminals 200a to 200c that belong to the base station 100a, and the power control information.

The controller 140 controls operations of the transceiver 110, the generator 120, and the information storage 130.

Figure 3:
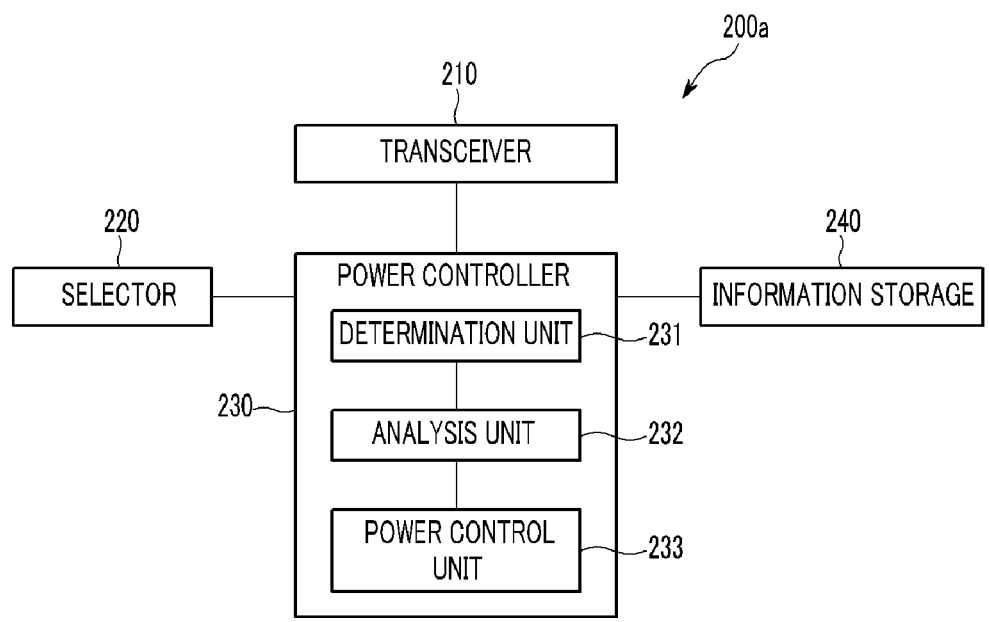
FIG. 3 is a schematic block diagram of a terminal 200a according to an exemplary embodiment of the present invention.

FIG. 3 is a schematic block diagram of a terminal 200a according to an exemplary embodiment of the present invention.

Referring to FIG. 3, the terminal 200a according to an exemplary embodiment of the present invention includes a transceiver 210, a selector 220, a power controller 230, and an information storage 240.

The transceiver 210 transmits information on monitoring cells of the terminal 200a to a base station 100a, and receives power control information from the base station 100a.

The selector 220 selects a monitoring cell and stores information on the selected monitoring cell in the information storage 240. When a channel difference between a channel attenuation value to a base station to which the terminal belongs and a channel attenuation value to an adjacent base station is equal to or less than a predetermined value, the selector 220 selects the corresponding adjacent cell as the monitoring cell.

The power controller 230 includes a determination unit 231, an analysis unit 232, and a power control unit 233, and controls communication power of the terminal 200a depending on the received power control information.

The determination unit 231 determines whether or not the monitoring cell is present in the terminal 200a on the basis of the monitoring cell information stored in the information storage 240.

The analysis unit 232 analyzes an interference state on the basis of the power control information received from the base station 100a. More specifically, the analysis unit 232 analyzes which state among a large-interference state, a normal-interference state, and a small-interference state the power control information is under on the basis of an interference state determination reference previously stored in the information storage 240.

The power control unit 233 controls the communication power of the terminal 200a for a frame after a predetermined point from a current frame on the basis of an interference state analyzed by the analysis unit 232. When the interference is large, the communication power decreases, when the monitoring cell is not present or the interference is normal, the previous communication power is maintained, and when the interference is small, the communication power increases.

The information on the monitoring cell of the terminal 200a, the information which becomes the reference for analyzing the interference state, and the communication power information are stored in the information storage 240.

Hereinafter, a method of power control for uplink according to an exemplary embodiment of the present invention will be described in detail with reference to the accompanying drawings.

Figure 4:
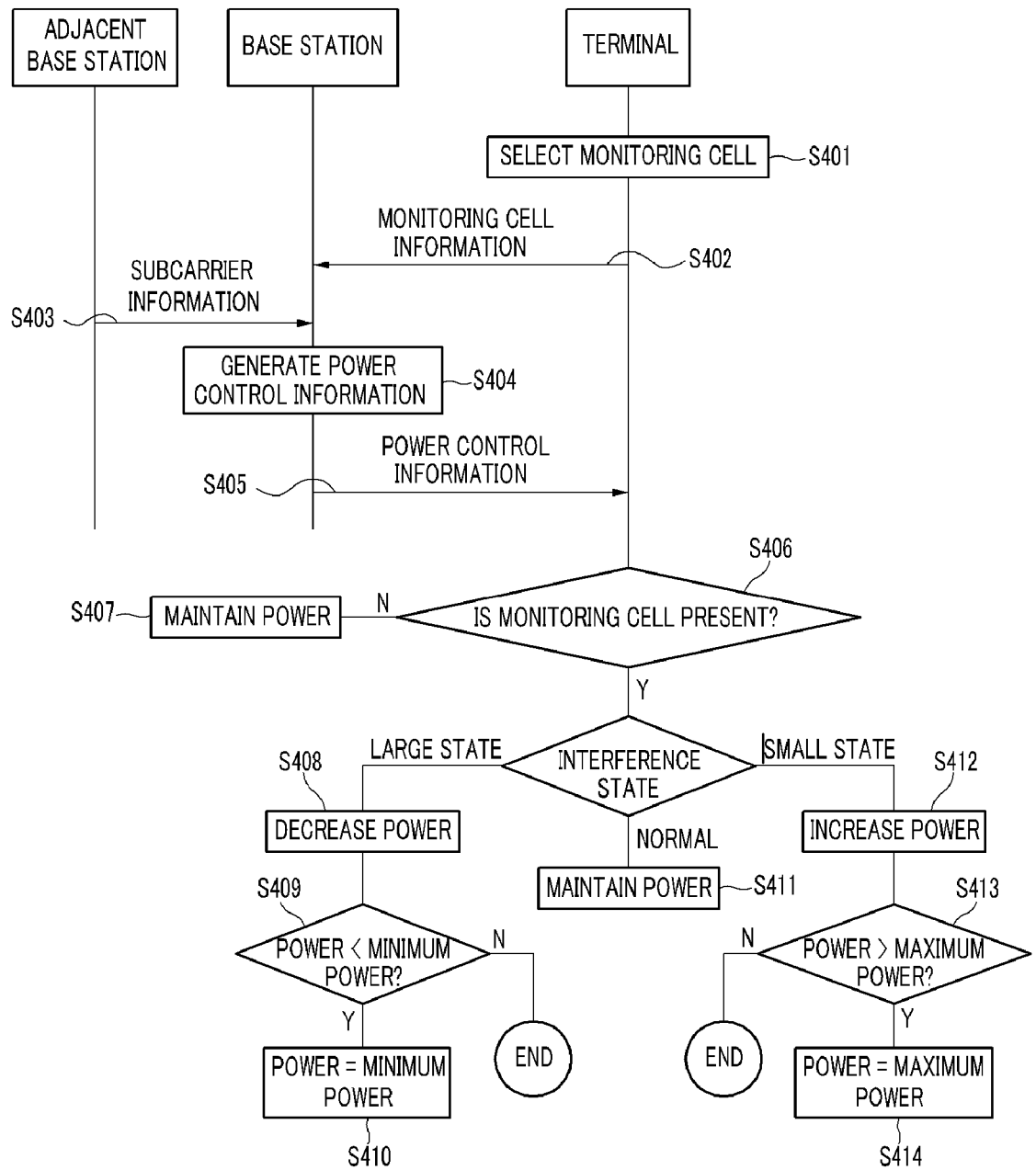
FIG. 4 is a flowchart of a method of power control for uplink according to an exemplary embodiment of the present invention.

FIG. 4 is a flowchart of a method of power control for uplink according to an exemplary embodiment of the present invention. Referring to FIG. 4, a terminal 200a selects a monitoring cell (S401) and transmits information on the selected monitoring cell to a base station 100a (S402). A base station 100a that receives the information on the monitoring cell stores the information on the monitoring cell as information on the corresponding terminal 200a.

Thereafter, the base station 100a receives information on subcarriers of each cell from adjacent base stations 100b to 100d (S403), analyzes the information on the monitoring cell of the terminal 100a, and generates power control information on the corresponding monitoring cell (S404). Thereafter, the base station 100a transmits the generated power control information to the terminal 200a (S405).

The terminal 200a that receives the power control information stores the received power control information in an information storage 240 and determines whether or not the monitoring cell is present in the terminal 200a on the basis of the information on the monitoring cell, which is stored in the information storage 240 (S406).

When the monitoring cell is not present, the terminal 200a maintains previous communication power (S407). Absence of the monitoring cell means that the terminal is positioned at the center of the cell to have little influence on the adjacent cells. In this case, power control is not performed.

When the monitoring cell is present, the terminal 200a determines an interference state on the basis of the power control information (S407). At this time, the analyzed interference state is classified into a large-interference state, a normal-interference state, and a small-interference state.

When the interference is large, the terminal 200a decreases communication power (S408), and determines whether or not the decreased power is smaller than a minimum power value to control the communication power to not be smaller than the minimum power value. More specifically, when the decreased power is smaller than the minimum power value (S409), the terminal 200a sets transmission power to the minimum power value (S410).

When the interference is normal, the terminal 200a maintains the previous communication power (S411).

When the interference is small, the terminal 200a increases the communication power (S412), and determines whether or not the increased power is larger than a maximum power value to control the communication power to not be larger than the maximum power value. More specifically, when the increased power is larger than the maximum power value (S413), the terminal 200a sets the transmission power to the maximum power value (S414). At this time, the minimum power value and the maximum power value are previously stored in the information storage 240.

According to the exemplary embodiment of the present invention, the uplink power of the terminal is controlled based on power control information for estimating whether or not the subcarriers used in the terminal and the subcarriers used in the monitoring cell hit each other. By this configuration, how frequently the subcarriers hit each other can be actually reflected on the uplink power control.

The embodiments of the present invention described above are implemented not only by the apparatus and the method, and may be implemented by a program embodying a function corresponding to the configuration of the embodiment of the present invention or a recording medium in which the program is recorded.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method to generate power control information in a base station, the method comprising:
   receiving subcarrier information on subcarriers allocated to a plurality of first terminals that belong to an adjacent base station from the adjacent base station;
   generating power control information for estimating whether an overlap occurs between the subcarriers allocated to the plurality of first terminals and subcarriers allocated to a second terminal that belongs to the base station, based on the subcarrier information, wherein generating the power control information comprises generating the power control information as a ratio calculated by one of:
   a total number of subcarriers allocated to the plurality of first terminals divided by a total number of subcarriers that can be used by the base station;
   a number of subcarriers allocated to the plurality of first terminals that are in common with subcarriers allocated to the second terminal divided by a total number of subcarriers allocated to the second terminal; or
   a number of subcarriers allocated to the plurality of first terminals that are in common with allocated subcarriers of the base station divided by a total number of the allocated subcarriers of the base station; and
   transmitting the power control information to a second terminal that belongs to the base station.

2. The method of claim 1, wherein the power control information represents a relationship between subcarriers allocated to the second terminal and the subcarriers allocated to the plurality of first terminals.

3. The method of claim 1, wherein a channel difference between a channel attenuation value to the base station from the second terminal and a channel attenuation value to the adjacent base station is not greater than a predetermined reference.

4. The method of claim 1, wherein the power control information is generated on a per frame basis.

5. The method of claim 1 further comprising receiving information regarding a monitored cell associated with the adjacent base station from the second terminal.

6. A method of power control for uplink in a terminal, the method comprising:
   receiving power control information for estimating whether an overlap occurs between subcarriers used by the terminal and subcarriers used by an adjacent base station from a base station;
   analyzing an interference state based on the power control information, wherein the interference state is classified as at least one of a first state, a second state, and a third state based on the power control information, a first-state interference is larger than a second-state interference, and the second-state interference is larger than a third-state interference; and
   controlling an uplink power based on the power control information and the interference state.

7. The method of claim 6, further comprising transmitting information on the adjacent base station to the base station.

8. The method of claim 7, wherein the adjacent base station has a channel attenuation value that shows a difference from a channel attenuation value to the base station from the terminal by as much as a predetermined reference.

9. The method of claim 6, wherein the power control information is a ratio calculated by dividing a total number of subcarriers used by each terminal that belongs to the adjacent base station by an entire number of subcarriers that can be used by the base station.

10. The method of claim 6, wherein the power control information is a ratio using a same subcarrier as the terminal that belongs to the adjacent base station among the subcarriers allocated to the terminal.

11. The method of claim 6, wherein the power control information is a ratio using a same subcarrier as a subcarrier used by the terminal among the entire subcarriers used by the terminal that belongs to the adjacent base station.

12. The method of claim 6, wherein, in the power control, when the interference state is the first state, a previous power decreases, when the interference state is the second state, the previous power is maintained, and when the interference state is the third state, the previous power increases.

13. The method of claim 6, wherein controlling the uplink power includes:
   setting the uplink power to a minimum power value when the uplink power is smaller than the minimum power value; and
   setting the uplink power to a maximum power value when the uplink power is larger than the maximum power value.

14. The method of claim 6 further comprising determining whether to control the uplink power based on whether information from the adjacent base station has been received.

15. The method of claim 6, wherein the power control information is generated on a per frame basis.

16. A base station comprising:
   a transceiver configured to receive and transmit information;
   a generator configured to generate power control information; and
   a controller coupled to the transceiver and the generator, the controller configured to:
   receive information regarding a monitored cell from a terminal that belongs to the base station, the monitored cell associated with an adjacent base station,
   receive subcarrier information regarding allocated subcarriers of the adjacent base station from the adjacent base station,
   generate the power control information for estimating whether an overlap occurs between allocated subcarriers of the adjacent base station and subcarriers allocated to the terminal that belongs to the base station, wherein the controller is configured to generate the power control information as a ratio calculated by one of:
   a total number of allocated subcarriers of the adjacent base station divided by a total number of subcarriers that can be used by the base station;
   a number of allocated subcarriers of the adjacent base station that are in common with subcarriers allocated to the terminal divided by a total number of subcarriers allocated to the terminal; or
   a number of allocated subcarriers of the adjacent base station that are in common with allocated subcarriers of the base station divided by a total number of the allocated subcarriers of the base station; and transmit the power control information to the terminal.

17. The base station of claim 16, wherein the power control information represents a relationship between subcarriers allocated to the terminal that belongs to the base station and the allocated subcarriers of the adjacent base station.

18. The base station of claim 16, wherein a channel difference between a channel attenuation value to the base station from the terminal and a channel attenuation value to the adjacent base station is not greater than a predetermined reference.

19. The base station of claim 16, wherein the power control information is generated on a per frame basis.

* * * * *